United States Patent [19]

Snyder

[11] E Re. 29,204

[45] Reissued May 3, 1977

[54] CONTROLLED HIGH VOLTAGE LIGHTING SYSTEM FOR GASEOUS-DISCHARGE LAMPS

[75] Inventor: Carl R. Snyder, Alief, Tex.

[73] Assignee: Esquire, Inc., New York, N.Y.

[22] Filed: June 24, 1976

[21] Appl. No.: 699,376

Related U.S. Patent Documents

Reissue of:

[64] Patent No.: 3,681,653
Issued: Aug. 1, 1972
Appl. No.: 26,615
Filed: Apr. 8, 1970

[52] U.S. Cl. ..... 315/106; 315/119; 315/174; 315/206; 315/239; 315/240; 315/276

[51] Int. Cl.[2] ..... H05B 41/23

[58] Field of Search ..... 315/105, 106, 107, 119, 315/127, 171, 174, 176, 200, 202, 205–208, 239, 240, 246, 260, 276, 290

[56] References Cited

UNITED STATES PATENTS

| | | | |
|---|---|---|---|
| 3,219,880 | 11/1965 | Pett | 315/240 |
| 3,235,769 | 2/1966 | Wattenbach | 315/176 |
| 3,474,290 | 10/1969 | Swain | 315/200 X |
| 3,522,475 | 8/1970 | Hashimoto | 315/239 |
| 3,544,839 | 12/1970 | Fahnrich | 315/200 |

FOREIGN PATENTS OR APPLICATIONS

| | | | |
|---|---|---|---|
| 1,182,028 | 2/1970 | United Kingdom | 315/105 |

*Primary Examiner*—Eugene La Roche
*Attorney, Agent, or Firm*—Arnold, White & Durkee

[57] ABSTRACT

A lighting system for gaseous discharge lamps for applying high voltage pulses to ignite the lamp and for discontinuing the application of high voltage pulses when the lamp is operating. The system includes ballast facilities having an inductive portion, and a control circuit which is responsive to a voltage induced in the inductive portion when the gaseous-discharge lamp operates. When the control circuit is operative, the pulsing portion of the system is disabled. The system is arranged so that the components of the control and pulsing circuits are not subjected to the application of high voltage pulses at any time.

16 Claims, 7 Drawing Figures

CONTROLLED HIGH VOLTAGE LIGHTING SYSTEM FOR GASEOUS-DISCHARGE LAMPS

Matter enclosed in heavy brackets [ ] appears in the original patent but forms no part of this reissue specification; matter printed in italics indicates the additions made by reissue.

This invention relates to a controlled high voltage lighting system for gaseous-discharge lamps, and particularly to a system for controlling the application of high voltage starting pulses to the gaseous-discharge lamp and preventing the application of such pulses to other components of the system.

BACKGROUND OF THE INVENTION

Gaseous-discharge lamps such as mercury vapor and other metallic additive vapor lamps, have long been employed in industrial lighting situations because of their extremely high efficiency when compared with other sources, such as incandescent lights. Many of the high pressure gaseous-discharge lamps, such as, for example, the mercury vapor lamp, are ignited by applying a voltage across a starting electrode and one of the main electrodes of the lamp to ionize some of the gas in the lamp arc tube. However, some of the more efficient and newer high pressure lamps, such as, for example, some metallic additive and the high pressure sodium lamps, do not readily permit the use of a starting electrode. To start such lamps, a plurality of high voltage pulses must be applied to ionize the gas in the arc tube. Typically, such a lamp may require a minimum of fifty pulses per second, where each pulse must have a peak voltage of more than 2,500 volts sustained for more than one microsecond.

Heretofore, circuits have been available which apply the necessary high voltage pulses to the lamp to ignite the lamp. However, some of these circuits, such as shown in British Pat. No. 1,119,874, continuously apply pulses each cycle or half-cycle to the lamp even after the lamp is lit. This continuously causes radio frequency interference as well as continuously stressing the components of the circuit by the application of the high voltage pulses thereto. Other circuits, which are designed to discontinue the application of the starting pulses once the lamp is lit, do so by detecting a current flow in the lamp side of the circuit, which is the portion of the circuit subjected to the high voltage pulses. One such circuit, shown in Canadian Pat. No. 826,768, has a thermal switch which is opened when the lamp ignites to discontinue the application of high voltage pulses. One of the disadvantages of such a circuit is that power is continually dissipated through the thermal switch when the lamp is on. Another circuit, is the type shown in U.S. Pat. No. 3,407,334 wherein components for discontinuing the high voltage pulses when the lamp ignites are connected to the lamp side of the circuit. Consequently, these components are subjected to high voltage pulses whenever the lamp is not lit. The significant drawback of such a circuit is that when the lamp is extinguished for a long period, such as by failure of the lamp, high voltage pulses are continuously applied to the control components. Normally, lamps in any particular installation may not be checked and replaced for days or weeks at a time. Furthermore, since in normal operation the control components are only momentarily subjected to high voltage pulses before ignition of the lamp, the values of these components are generally selected on the basis of the normal operating voltages which are applied thereto. To select components having high voltage ratings would undesirably increase both the physical size of the circuitry as well as the cost. Thus, in such a circuit, when a lamp is not replaced soon after failure, the control components are subjected to the continuous application of perhaps millions of high voltage pulses. This almost invariably results in the failure of one or more of these components. Moreover, the lamp ballast and control circuit components are normally as integral package which, upon failure of any one component, must be completely replaced. It is not only expensive to replace such components, but it is also time consuming and laborious to do so, especially considering that most lamp fixtures are placed in relatively high places which are difficult to reach.

SUMMARY OF THE INVENTION

The present invention of a controlled high voltage lighting system for gaseous-discharge lamps includes a voltage source, and a ballast, part of which is an inductor connected in series with a gaseous-discharge lamp. A high voltage pulsing circuit is connected on the source side of the circuit to the inductor and includes a charging circuit having a capacitor and a resistor in series which controls the firing of a switching device having a predetermined threshold voltage. When the switch is triggered, a gating voltage is applied to an SCR which is connected in series with a capacitor. The series combination of the SCR and capacitor are connected to a small number of turns of the inductor. At the instant of firing of the SCR, the inductor becomes an autotransformer and a high voltage pulse is applied to the gaseous-discharge lamp. When the lamp ignities, a voltage is induced in the small number of turns of the inductor and is used to fire a gated bilateral switch which bypasses the charging circuit capacitor to prevent any further pulses during operation of the lamp.

Upon extinguishment of the gaseous-discharge lamp for any reason, the induced voltage in the small number of turns of the inductor ceases, thus resulting in the gated bilateral switch being turned off to permit the pulsing circuit to again become effective to apply a series of high voltage pulses to the lamp to re-ignite the lamp. No high voltage pulses, however, are applied to any of the components of the pulsing or charging circuits since they are connected on the source side of the system and not the lamp side. Furthermore, after the gaseous-discharge lamp ignities no voltage is applied across either the charging or pulsing capacitor or the switching device during the long operation of the lamp itself. Thus, increased life of the components is realized, thereby increasing the life and reliability of the lighting system.

Other advantages of the present invention will be apparent from the following detailed description when considered in conjunction with the following detailed drawings.

DESCRIPTION OF THE PREFERRED EMBODIMENTS

Figure 1:
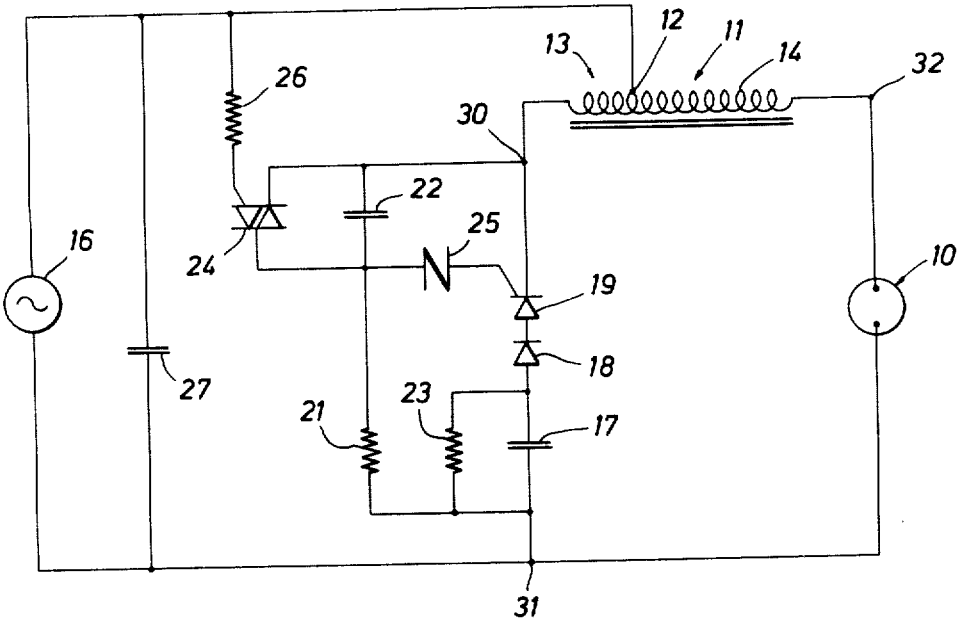
FIG. 1 is a detailed circuit diagram of the gaseous-discharge lamp lighting system which embodies the principles of the present invention.

Referring now to FIG. 1, there is shown a gaseous-discharge lamp, such as a sodium lamp, generally designated as 10. While reference is made hereinafter to lamp 10 as being a high pressure sodium lamp, it is to be understood that the present invention is applicable to any high or low pressure gaseous-discharge lamp which requires a high voltage pulse or series of pulses for ignition. The circuit includes an inductor or reactor type ballast 11 connected in series with the lamp 10. An AC voltage source 16 is connected to the inductor 11 at tap 12 dividing the reactor into a small number of windings, hereinafter called primary windings, and a large number of windings hereinafter called secondary windings 14. Connected to the primary windings 13 is a pulsing circuit including a series combination of a capacitor 17, a diode 18 and an SCR 19. The diode 18 is only used to increase the reverse voltage capability of the SCR 19. The diode 18 need not be used if a higher voltage rated SCR is selected. Additionally, if pulses were desired or required each half cycle, a triac could replace the diode 18 and SCR 19. An integrator or charging circuit including a resistor 21 and capacitor 22 is connected in parallel across the series combination of capacitor 17, diode 18 and SCR 19. A bilateral switch 25 having a predetermined voltage threshold value connects the juncture of the resistor 21 and capacitor 22 to the gate terminal of the SCR 19. The bilateral switch 25 is a device which conducts when the predetermined threshold voltage is reached for either the positive or negative half cycles. The bilateral switch is used because it is available at low cost. However, a unilateral switch could also be used with the SCR 19. Another resistor 23 is connected in parallel across the capacitor 17 for discharging it. A circuit for bypassing the charging and pulsing circuits when the sodium lamp 10 is ignited consists of a gated bilateral switch, such as triac 24, connected across the capacitor 22 and having its gate electrode connected to a limiting resistor 26.

In operation, consider the lamp 10 as being extinguished. When the voltage source 16 is energized, capacitor 22 begins charging through resistor 21 until it reaches the threshold voltage of bilateral switch 25, firing the switch, thereby applying a gate signal to the SCR 19 rendering the SCR conductive. The time constant of the resistor 21 and capacitor 22 of the charging circuit is selected so that the threshold voltage of the bilateral switch 25 is reached close to the peak of the applied line voltage in each half-cycle. Accordingly, the SCR 19 is rendered conductive at the time when there is a maximum voltage potential across the SCR 19.

When SCR 19 becomes conductive, point 30 is near the same potential as point 31 due to the low impedance state of the discharged capacitor 17, causing peak line voltage to be applied to the primary windings 13 of the inductor 11. This applies a voltage pulse to the lamp 10 which is equal to the ratio of the number of turns of the windings of the secondary 14 to the number of turns of the windings in the primary 13 multiplied by the instantaneous line voltage at the point of firing. Typically, this ratio is at least 10:1. A typical high pressure sodium lamp requires for ignition a minimum of 50 pulses per second where each pulse is at least 2,500 volts and has a duration of at least 1 microsecond. At the time the pulse is applied to the inductor 11, the inductor functions as an autotransformer. The time constant of the discharging circuit, which includes the capacitor 17, and resistor 23 is selected to be equal to or less than the period of the line voltage, which at 60 cycles will be one-sixtieth of a second. Thus, when the SCR 19 conducts, the capacitor 17 charges very quickly to approximately two times the value of line voltage at the time of firing, thereby back-biasing the SCR 19 and turning it off. The value of the resistor 23 preferably is selected to discharge the capacitor 17 by the time of the next pulse and to maintain the SCR 19 sufficiently back-biased so that it cannot conduct even if the bilateral switch is triggered again during the positive half cycle.

Figure 5:
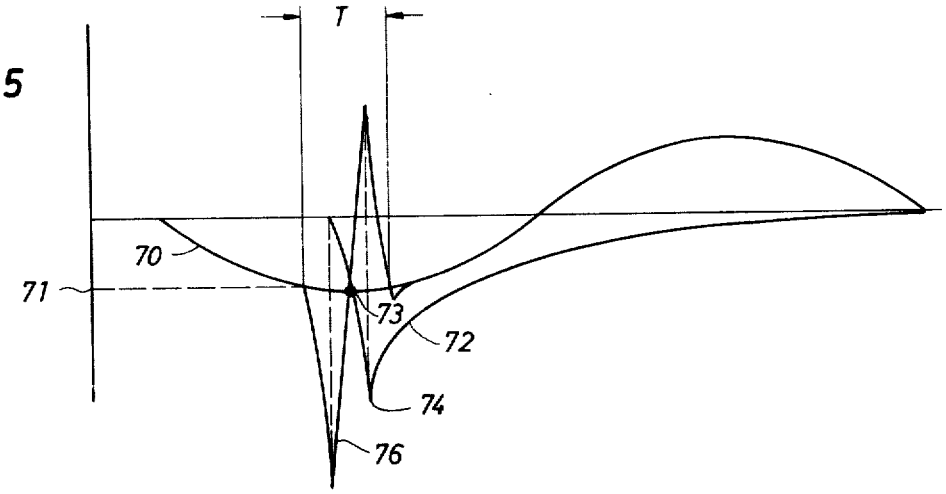
FIG. 5 is an exaggerated graphic representation of the line voltage, the pulsing capacitor discharge curve, and the voltage applied to the lamp before it ignites.

Referring now to FIG. 5, there is shown a graphic representation of the source or line voltage 70 as it varies with time. The threshold voltage of bilateral switch 25 is represented by line 71. When the bilateral switch 25 fires, the SCR 19 is turned on. At the instant of turn-on, a high voltage 76 is produced across the lamp 10 in proportion to the turns ratio as described hereinabove. At the point the high voltage peaks, voltage across capacitor 17, represented by the line 72 starts to build and draws current through windings 13 causing a flux in the inductor 11. When the capacitor voltage 76 reaches point 73, which is equal to the *negative* peak line voltage, there is no longer current flow from the line and the SCR 19 becomes back-biased. However, the stored flux in the core of inductor 11 causes the capacitor 17 to continue to charge to point 74, which is approximately two times the *negative* peak line voltage. The time T of the pulse is greatly exaggerated in FIG. 5 for the purpose of illustration. Typically, T may be only 20 micro-seconds. Accordingly, curve 76 should be illustrated as a straight vertical line. Furthermore, the charging portion of the capacitor voltage curve 72 is likewise exaggerated, and if drawn correctly would be substantially a straight vertical line. The capacitor discharges in accordance with the value selected for resistor 23. The resistor 23 is preferably selected so that capacitor 17 is discharged somewhere between a maximum of 360 degrees and a minimum which maintains the SCR sufficiently back-biased, so that it cannot conduct even if bilateral switch 22 fires. Thus, so long as *the absolute value of the* capacitor discharge curve 72 exceeds *the absolute value of the* line voltage curve 70, no further pulses can be applied during the [ positive ] *negative* half-cycle. If desired, however, the values of resistors 21 and 23, capacitors 22 and 17, and bilateral switch 25 can be selected to produce a plurality of high voltage pulses every half-cycle.

Once an arc is struck in the lamp 10, the inductor 11 again functions as a current limiter and the current drawn through the windings 14 of the inductor 11 induces a voltage across the windings 13. This causes a voltage to be applied through the limiting resistor 26 to the gate of the triac 24 to render it conductive. When the triac 24 conducts, it bypasses the capacitor 22 which prevents any further triggering of SCR 19 and consequently, any further high voltage pulses from being applied to the lamp 10.

If the lamp 10 is extinguished for any reason, the triac 24 turns off, and a series of high voltage pulses are again applied to the lamp 10 to re-ignite it, as hereinabove described. The unique arrangement of the components of the pulsing, charging and bypassing circuit on the primary or source side of the system, instead of the lamp side, insures that the components are not subjected to high voltage pulses at any time that the pulsing circuit is operative. This is of particular importance when the lamp 10 burns out and may not be replaced several days or weeks. In such a situation, the pulsing circuit will continuously be operative and millions of high voltage pulses may be applied to the lamp 10. If any of the components of the circuit were subjected to such high voltage pulses for long periods of time, invariably failure of one or more components would result. By not subjecting any components, other than lamp 10, to the high voltage pulses, failure of any components is minimized, and the overall reliability of the system is greatly increased.

Only a small amount of control current flows through the resistor 21, triac 24, and windings 13 during operation of the lamp 10, thus failure of any of these components is minimized. The critical components, including capacitor 17, capacitor 22 and bilateral switch 25 are completely de-energized during long hours of operation of lamp 10.

Figure 2:
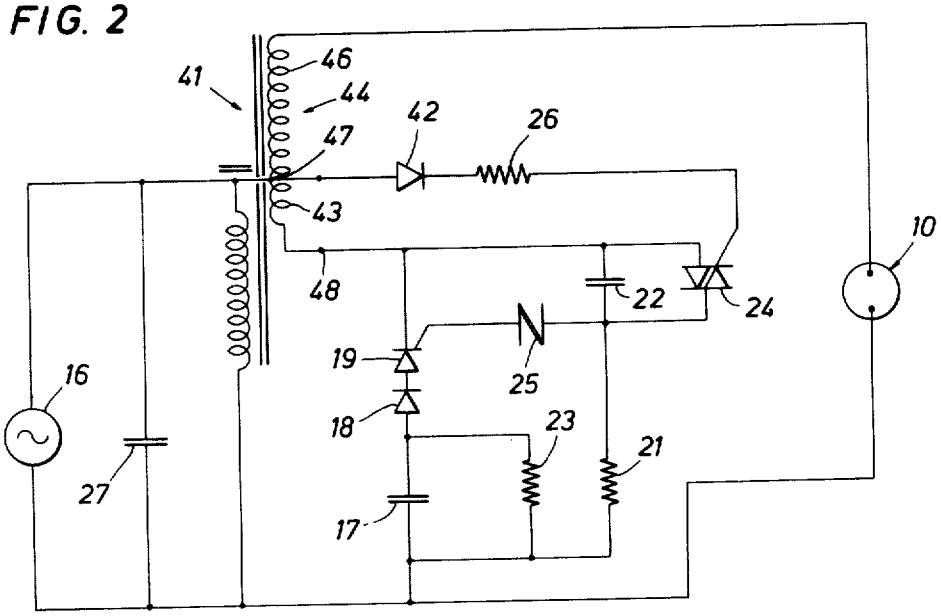
FIG. 2 is a detailed circuit diagram of the lighting system utilized in conjunction with a high reactance autotransformer type ballast.

Referring to FIG. 2, there is shown substantially the same circuit of FIG. 1, with the exception that the ballast is a high reactance autotransformer 41 and a diode 42 is included. The autotransformer is used to raise the line voltage to above the minimum RMS sustaining voltage of the lamp 10. In the operation of this circuit, when lamp 10 is extinguished and line voltage is applied, the capacitor 22 begins to charge and when it reaches the threshold voltage of the bilateral switch 25 a gating voltage is applied to the SCR 19. When SCR 19 becomes conductive, current flows through windings 43 as capacitor 17 charges up. The voltage applied through windings 43 are stepped up in accordance with the ratio of the number of windings 46 to the number of windings 43 and a high voltage pulse is applied to the sodium lamp 10. Typically, the values of resistor 21, capacitor 22, bilateral switch 25, and capacitor 17 are selected so that one high voltage pulse is applied each [ positive ] *negative* half cycle until lamp 10 ignites. The values of these components may, however, be selected so as to apply a series of pulses during each [ positive ] *negative* half cycle. Since point 47 is negative with respect to point 48 prior to the ignition of the lamp 10, the diode 42 is provided to prevent a negative voltage from triggering the triac 24. After the lamp 10 ignities, the current draw through windings 46 induces a voltage through windings 43 causing point 47 to be positive with respect to point 48 and this potential is applied to the gate terminal of triac 24 through the diode 42 and limiting resistor 26 to render the triac 24 conductive. As long as the lamp 10 is lit, a circuit is completed through the resistance 21, triac 24, and windings 43 which bypasses the capacitor 22 and renders the pulsing and charging circuits inoperative.

Figure 3:
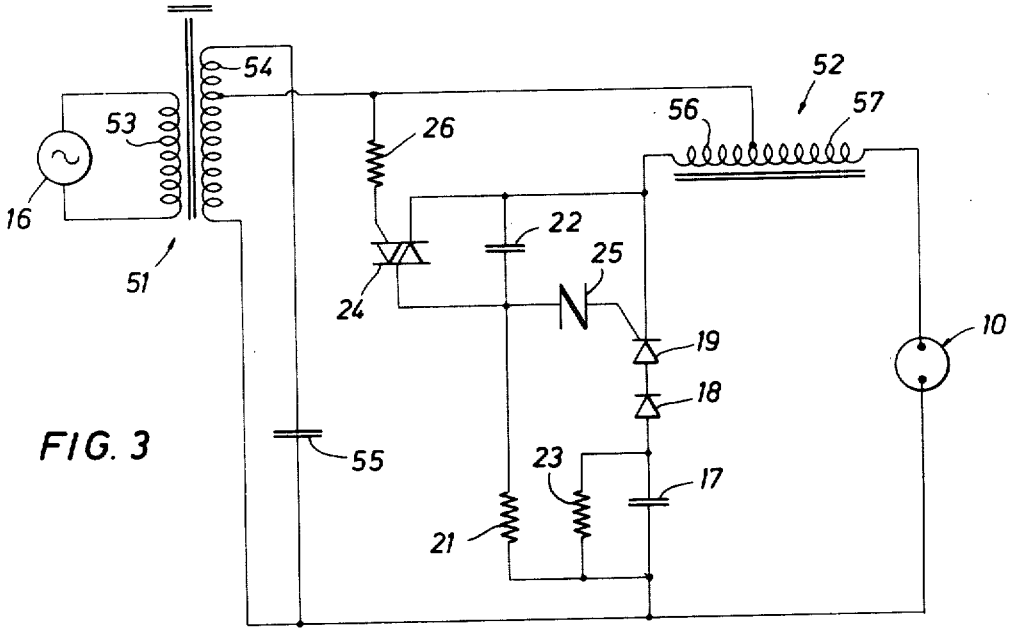
FIG. 3 is a detailed circuit diagram of the lighting system utilized in conjunction with a high reactance autotransformer type ballast.

Referring now to FIG. 3 there is shown substantially the same circuit as shown in FIGS. 1 and 2 except that the ballast includes a constant voltage transformer generally designated as 51, and an inductor or reactor generally designated as 52. The transformer 51 has a primary 53 and a secondary 54 and is used for stepping up the line voltage while the inductor 52 provides the necessary current limiting function. A capacitor 55 is connected across the secondary windings 54 for regulating the voltage applied to the inductor 52. Thus, a relatively constant voltage is applied to the inductor 52, which regulates the wattage dissipated in the lamp 10. In the operation of this circuit, when voltage source 16 is applied, the voltage across the primary 53 is stepped up so that a higher constant voltage is applied to the inductor 52. When SCR 19 conducts, capacitor 17 charges and a current flows in the primary windings 56 of the inductor 52 producing a high voltage in the secondary windings 57 which is applied to the lamp 10. As described hereinabove, the value of components 17, 21, 22, and 25 can be selected so that a high voltage pulse is applied for a predetermined period of time to ignite the lamp 10. When the lamp 10 ignities, a relatively high current is drawn therethrough inducing a voltage in the windings 56 of the inductor 52. This causes a current flow through the circuit including the resistor 26, and a gating voltage is applied to the triac 24 triggering the triac which bypasses the capacitor 22. As long as lamp 10 is lit, triac 24 is conductive thereby preventing any further high voltage pulses from being applied to the lamp 10. Constant voltage ballasts are well known in the field of lighting and these are two typical designs (FIGS. 3 and 4).

Figure 4:
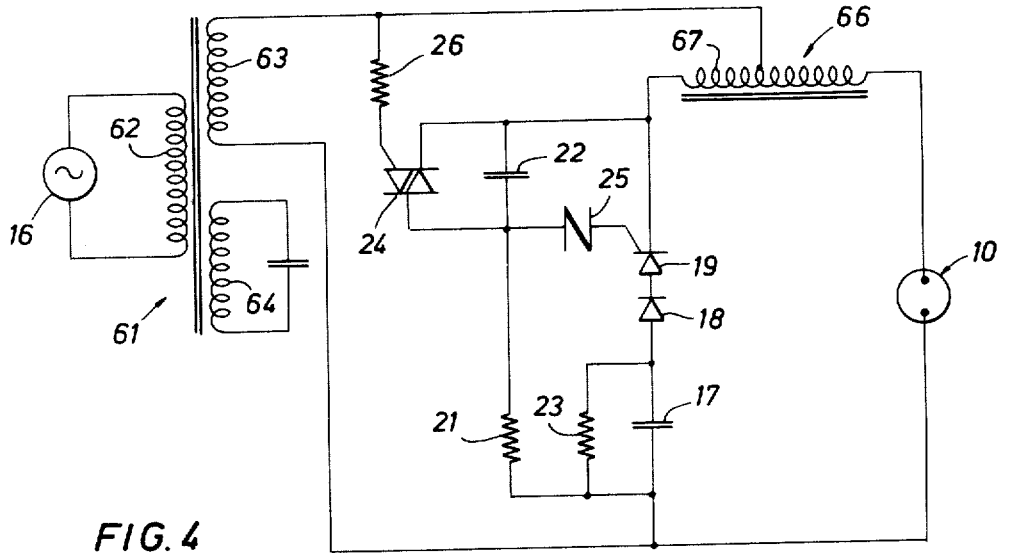
FIG. 4 is a detailed circuit diagram of the lighting system used in conjunction with a constant voltage transformer having an isolated secondary coil.

Referring now to FIG. 4, there is shown a similar starting circuit used in combination with a constant voltage transformer ballast generally designated as 61 having a primary winding 62, an isolated secondary winding 63, and an isolated capacitor winding 64. The ballast 61 is used to regulate the voltage applied to the inductor 66. In operation, when voltage source 16 is energized, capacitor 22 begins to charge until it reaches the threshold value of bilateral switch 25 whereupon the switch 25 fires to apply a trigger voltage to the SCR 19 rendering it conductive. Current then passes through the windings 67 of the reactor 66 as capacitor 17 charges up. This produces a high voltage pulse which is applied to the lamp 10. When the lamp 10 ignites, it draws a high current, thereby inducing a voltage in the windings 67 which produces a gate voltage through the resistor 26 to render the triac 24 conductive. This bypasses the capacitor 22 to render the high voltage pulsing circuit inoperable so that no pulses are applied to the lamp 10 so long as it is lit. Of course, whenever lamp 10 is extingushed, there will be no voltage induced in windings 67 and the triac will turn off, permitting the pulsing circuit to again become operative for applying high voltage pulses to re-ignite the lamp.

Figure 6:
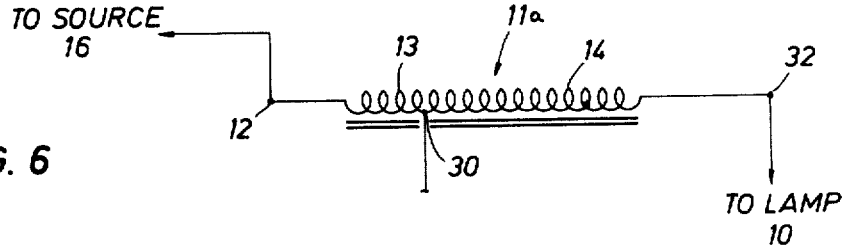
FIG. 6 is a partial view of the inductor in FIG. 1 illustrating a different way of connecting the pulsing circuit to the inductor.
Figure 7:
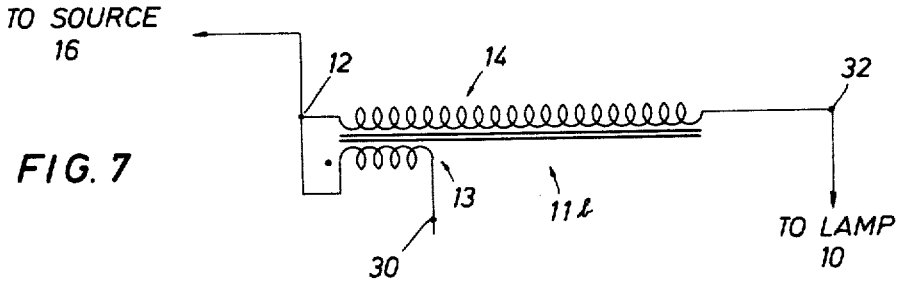
FIG. 7 is a partial view of an inductor which can replace the inductor shown in FIG. 1.

Referring now to FIGS. 6 and 7, there are shown two different ways of connecting the inductors designated as 11a and 11b in the system shown in FIG. 1. In FIG. 6, point 12 connects the end of the inductor with the source 16, and a tap connects the SCR 19 to the inductor as shown. The only functional difference in this arrangement is that the high voltage pulses are out of phase with the line voltage. Even though the pulses are out of phase, however, they can still be high enough to ignite lamp 10. In FIG. 7, the windings 13 are isolated from the windings 14. Other than this, the inductor 11b functions similar to inductor 11 in FIG. 1. Many other arrangements may be utilized in accordance with the principles of the subject invention.

The subject system provides an effective and reliable way to operate and control gaseous-discharge lamps requiring high voltage pulses to start. By detecting induced voltages in a portion of the inductor on the source side of the circuit, the control components of the system are connected in such a manner as to prevent the application of high voltage pulses thereto when the lamp 10 is extinguished for any reason. Furthermore, the control components are so arranged that they are not substantially energized during the long periods of operation of the lamp. Consequently, this unique system is extremely reliable.

It is to be understood that the above described embodiments are merely illustrative of applications of the principles of this invention, and that numerous other arrangements and modifications may be made within the spirit and scope of the invention.

What is claimed is:

1. A gaseous-discharge lamp lighting system comprising:

a gaseous-discharge lamp;

ballast means including an inductive portion operatively connected to said lamp;

a voltage source connected to said ballast means;

pulsing means for inducing pulses in the inductive portion of said ballast means to ignite said lamp including:

a first series combination of a gated switch means and a capacitance connected to one end of said inductive portion of said ballast means; and charging means for applying a gating signal to said switch means at a predetermined time at least once every cycle to render said switch means conductive;

control means for inductively sensing current flow through the inductive portion when said lamp is ignited including gated bilateral switch means which is triggered by voltage inducted in said winding to conduct during operation of said lamp and render said pulsing means inoperative.

2. A gaseous discharge lamp lighting system comprising:

a gaseous discharge lamp;

ballast means including an inductive portion operatively connected to said lamp;

a voltage source connected to said ballast means;

means for inducing pulses in the inductive portion of said ballast means to ignite said lamp;

control means for inductively sensing current flow through the inductive portion when said lamp is ignited for disabling said pulsing means;

a first series combination of a gated switch means and a capacitance connected to one end of said inductive portion of said ballast means;

charging means for applying a gating signal to said gated switch means at a predetermined time at least once every cycle to render said switch means conductive;

a second series combination of a resistance and a capacitance connected in parallel across said first series combination, and switch means having a predetermined threshold voltage connected between the juncture of said resistance and capacitance and the gate of said gated switch means.

3. A lighting system as set forth in claim 2 wherein a resistance is connected across the capacitance of said first series combination to discharge said capacitance at a predetermined rate.

4. A lighting system as set forth in claim 3 wherein said predetermined rate is selected so that only one high voltage pulse is applied to the lamp each [ positive ] *negative* half-cycle.

5. A lighting system as set forth in claim 2 wherein said gated switch means is a controlled rectifier and a diode is serially connected therewith.

6. A lighting system as set forth in claim 1 wherein said ballast means is an autotransformer having a primary winding and a secondary winding and wherein said inductive portion is a portion of said secondary winding, and including a power factor capacitance connected across said primary winding.

7. A lighting system as set forth in claim 1 wherein said pulsing means further includes:

said charging means including a second series combination of a resistance and a capacitance connected in parallel across said first series combination: and switch means having a predetermined threshold voltage connected between the juncture of said resistance and capacitance of said second series combination and the gate of said gated switch means.

8. A lighting system as set forth in claim 7 wherein said gated bilateral switch means is connected across said capacitance of said second series combination, and having its gate terminal serially connected to said winding so that upon conduction of said lamp a gating voltage is applied to said gated bilateral switch means to bypass said capacitance of said second series combination.

9. A lighting system as set forth in claim 8 wherein a resistance is connected across the capacitance of said first series combination to discharge said capacitance at a predetermined rate.

10. A lighting system as set forth in claim 1 wherein said ballast means includes a constant voltage transformer having a primary winding connected to said voltage source and a secondary winding connected across said lamp, and an inductor serially connected to said lamp.

11. A lighting system as set forth in claim 10 wherein said constant voltage transformer further includes an isolated capacitor winding to regulate the voltage applied to said inductor.

12. A gaseous-discharge lamp lighting system comprising:

an AC voltage source;

a gaseous-discharge lamp;

autotransformer ballast means having a primary winding connected to said voltage source and a secondary winding connected to said lamp, said secondary winding having a first portion with a first number of turns and a second portion with a substantially greater number of turns;

pulsing means including:

a first series combination of a gated switch means and a capacitor connected to one end of said first portion; and charging means for applying a gating signal switch means at a predetermined time at least once every cycle to render said switch means conductive thereby applying pulses to ignite said gaseous-discharge lamp; and control means for detecting current flow in said first portion of said said secondary winding when said gaseous-discharge lamp is operating for disabling said pulsing means.

13. A lighting system as set forth in claim 12 wherein said control means includes a gated bilateral switch having its gate terminal connected to said first portion through a series combination of a diode and a limiting resistance, said gated bilateral switch being conductive when a voltage is induced said first portion during operation of said lamp, the conduction of said gated bilateral switch disabling said pulsing means.

14. A lighting system as set forth in claim 12 wherein: said pulsing means includes:

a first resistance connected across said capacitance, a second series combination of a second resistance and a second capacitance connected across said first series combination, and switch means interconnecting the gate terminal of said gated switch means and the juncture of said second resistance and second capacitance; and said control means includes:

gated bilateral switch means connected across said second capacitance and having the gate terminal thereof connected to said first portion of said secondary winding.

15. A lighting system as set forth in claim 14 wherein the gate terminal of said gated bilateral switch means is connected to said first portion through a series combination of a resistance and a diode.

*16. A lighting system as set forth in claim 2, wherein:*

*a resistance is connected across the capacitance of said first series combination to discharge said capacitance at a predetermined rate; and*

*said predetermined rate is selected so that on high voltage pulse is applied to the lamp each negative half-cycle of the input voltage.*

* * * * *

UNITED STATES PATENT AND TRADEMARK OFFICE

CERTIFICATE OF CORRECTION

PATENT NO. : RE 29,204

DATED : May 3, 1977

INVENTOR(S) : Carl R. Snyder

It is certified that error appears in the above-identified patent and that said Letters Patent are hereby corrected as shown below:

Col. 7, line 45, "inducted" should read --induced--;
Col. 8, line 27, ":" should read --;--;
Col. 10, line 20, "on" should read --one--.

Signed and Sealed this

*sixteenth* Day of *August 1977*

[SEAL]

*Attest:*

RUTH C. MASON
*Attesting Officer*

C. MARSHALL DANN
*Commissioner of Patents and Trademarks*